No. 707,695. Patented Aug. 26, 1902.
J. H. HOADLEY.
MOTOR VEHICLE.
(Application filed Dec. 27, 1900.)
(No Model.)

Witnesses:
Geo. H. Knight Jr.
J. Green

Inventor
Joseph H. Hoadley
by Knight Bros
Att'ys.

UNITED STATES PATENT OFFICE.

JOSEPH H. HOADLEY, OF NEW YORK, N. Y., ASSIGNOR TO THE PNEUMATIC CARRIAGE COMPANY, OF NEW YORK, N. Y., A CORPORATION OF WEST VIRGINIA.

MOTOR-VEHICLE.

SPECIFICATION forming part of Letters Patent No. 707,695, dated August 26, 1902.

Application filed December 27, 1900. Serial No. 41,211. (No model.)

*To all whom it may concern:*

Be it known that I, JOSEPH H. HOADLEY, a citizen of the United States, residing at New York, in the county and State of New York, have invented certain new and useful Improvements in Motor-Vehicles, of which the following is a specification.

This invention relates to improvements in motor-vehicles; and its object is to provide means for driving from the same motor two independently-mounted steering-wheels of the steering-truck, so as to obtain in one construction the advantages resulting from independently-mounted steering-wheels, traction through the steering-wheels, and propulsion by a single motor. The use of a single motor has certain advantages in efficiency and economy; but my invention does not preclude the use of more than one motor, provided they are mechanically connected to act as a single driving agent.

Figure 1:
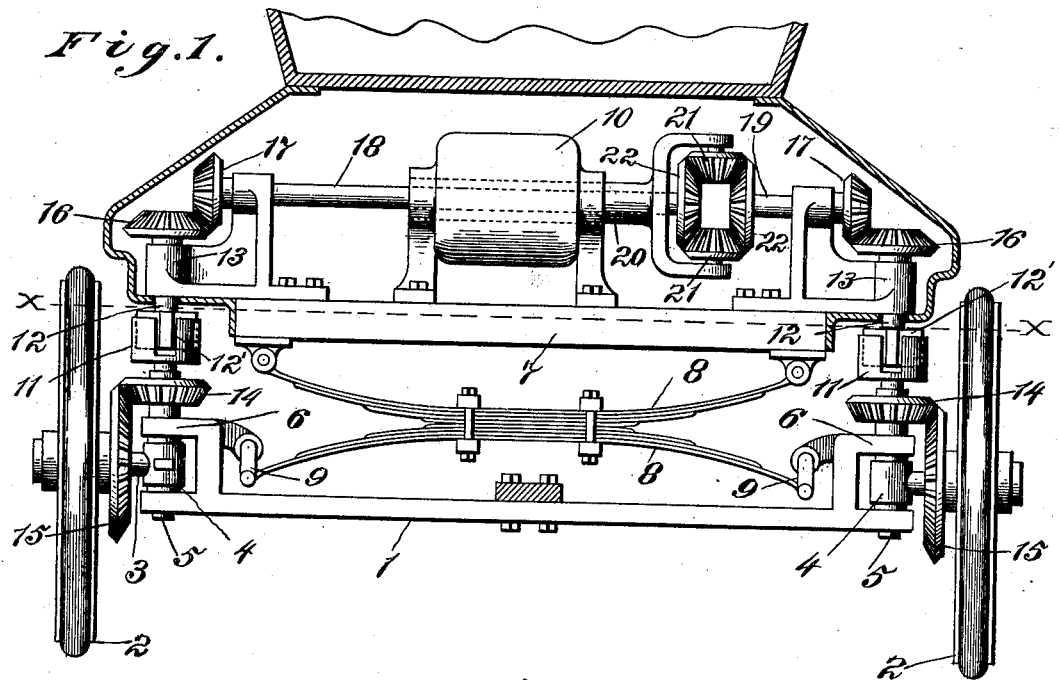
Figure 2:
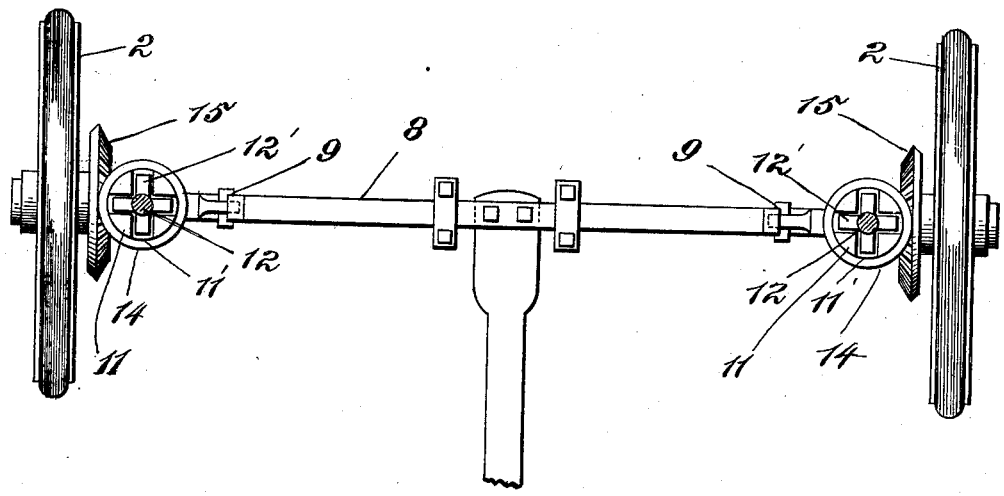

In the accompanying drawings, Figure 1 is a vertical transverse section of a vehicle-truck, showing in elevation the parts constituting my invention. Fig. 2 is a horizontal section on the line $x\,x$ in Fig. 1.

1 represents the truck or running-gear frame, and 2 2 the front or steering wheels, which in this case are also the driving-wheels. Each wheel 2 is mounted to rotate on a short axle or pivot 3, whose hub or collar 4 is mounted to turn or swivel on a pivot 5, journaled in bearings 6 on the truck-frame, said bearings embracing the hub of the axle 3, so as to support the truck vertically. It will be understood that steering devices (not shown) would be connected to the respective independent axles 3 3 to turn them on the pivots 5 to proper position for steering.

The vehicle body or frame 7 is supported from the truck by springs—for example, the semi-elliptic springs 8 8, connected, respectively, to the vehicle-body 7 and to the truck-frame 1—links or suspension devices 9 being preferably provided for one of the said springs, so as to permit a certain amount of relative lateral movement of the vehicle-body and the truck-frame.

The driving-motor 10, which may be an electric or other motor, is spring-supported, preferably by being mounted on the vehicle-body 7, and connecting or transmitting mechanism is employed which drives the steering-wheels 2 2 by the power of said motor, while allowing for relative movement of the vehicle-body and truck and while also allowing free movement of the steering-wheel axles about their pivots. For this purpose I provide means for driving each wheel 2 through a gear concentric with the swivel or pivot 5 of said wheel, so that motion of said wheel around said pivot will not affect the power transmission, and I also provide an extensible connection in the power-transmitting devices which permits of the up-and-down movement of the vehicle-body and the motor. Each spindle 5 carries one member 11 of an extensible coupling, which member consists of a disk or hub with cross-grooves 11′ therein, and the other member of such coupling consisting of cross-flanges 12′ on a shaft 12, mounted in bearings 13 on vehicle-body 7. The shafts or spindles 5 5 carry bevel-wheels 14 14, engaging, respectively, with bevel-gears 15 15 on the vehicle-wheels 2 2, and the upper shafts 12 12 carry bevel-wheels 16 16, engaging with bevel-wheels 17 17, respectively, on a shaft 18 and on a shaft 19, connected to said shaft 18 by a compensating gear. The shaft 18 passes axially through the motor-shaft 20, and said shaft 20 carries the pinions 21 of the compensating gear, whose main bevel-wheels 22 are respectively attached to the two shafts 18 and 19. The object of the compensating-gear connection is to permit the wheels to move with different velocities in rounding curves.

By means of the above arrangement the motor is spring-supported as a whole—that is, no part of the same is in rigid connection with the axle—and the protection of the motor from injury is therefore as full as possible. The vehicle-body can rise and fall and even rock or swing from side to side without appreciably affecting the efficiency of transmission, as the members 11 12′ of the couplings simply slide on one another during such movements.

By the term "gear" as herein used I mean any suitable power-transmitting wheel, whether toothed or frictional.

Having thus described my invention, the following is what I claim as new therein and desire to secure by Letters Patent:

1. In a motor-vehicle, the combination with the traction-wheels and their independent shafts, and the truck-frame to which said shafts are pivotally connected, of a vehicle-frame spring-supported on the truck-frame, a motor carried by said vehicle-frame, a shaft connected to said motor, shafts on the spring-supported vehicle-frame in line with the pivotal shafts for the traction-wheels, connections comprising bevel-gears from the motor-shaft to the other spring-supported shafts, extensible couplings between the last-named shafts and the pivotal shafts for the traction-wheels, and bevel-wheels on said pivotal shafts and on the traction-wheels, whereby the motor drives both traction-wheels while pivotal and vertical movements of the latter relative to the motor are permitted.

2. In a motor-vehicle, the combination with the traction-wheels and their independent shafts, and the truck-frame to which said shafts are pivotally connected, of a vehicle-frame spring-supported on the truck-frame, a motor carried by said vehicle-frame, a shaft connected to said motor, shafts on the spring-supported vehicle-frame in line with the pivotal shafts for the traction-wheels, connections comprising bevel-gears from the motor-shaft to the other spring-supported shafts, the connection to one of said shafts also comprising a compensating gear, extensible couplings between the last-named shafts and the pivotal shafts for the traction-wheels, and bevel-wheels on said pivotal shafts and on the traction-wheels, whereby the motor drives both traction-wheels while pivotal and vertical movements of the latter relative to the motor are permitted.

JOSEPH H. HOADLEY.

Witnesses:
A. P. KNIGHT,
HARRY E. KNIGHT.